(12) United States Patent
Mhatre et al.

(10) Patent No.: US 8,997,227 B1
(45) Date of Patent: Mar. 31, 2015

(54) ATTACK TRAFFIC SIGNATURE GENERATION USING STATISTICAL PATTERN RECOGNITION

(75) Inventors: Amit J. Mhatre, Seattle, WA (US); Andrew John Kiggins, Seattle, WA (US); Michael F. Diggins, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 421 days.

(21) Appl. No.: 13/406,274

(22) Filed: Feb. 27, 2012

(51) Int. Cl.
*G06F 12/14* (2006.01)
*G06F 21/56* (2013.01)

(52) U.S. Cl.
CPC ................................ *G06F 21/566* (2013.01)
USPC ......................................................... 726/23

(58) Field of Classification Search
USPC ......................................................... 726/23
See application file for complete search history.

(56) References Cited

U.S. PATENT DOCUMENTS

| | | | |
|---|---|---|---|
| 6,347,310 B1 | 2/2002 | Passera | |
| 6,944,673 B2 | 9/2005 | Malan et al. | |
| 7,424,619 B1 | 9/2008 | Fan et al. | |
| 7,478,075 B2 | 1/2009 | Urmanov et al. | |
| 7,792,770 B1 | 9/2010 | Phoha et al. | |
| 2003/0204621 A1 | 10/2003 | Poletto et al. | |
| 2006/0107321 A1* | 5/2006 | Tzadikario | 726/22 |
| 2008/0052774 A1* | 2/2008 | Chesla et al. | 726/13 |
| 2010/0082513 A1 | 4/2010 | Liu | |
| 2011/0231510 A1* | 9/2011 | Korsunsky et al. | 709/213 |

* cited by examiner

*Primary Examiner* — Tu Nguyen
(74) *Attorney, Agent, or Firm* — Knobbe, Martens, Olson & Bear, LLP

(57) ABSTRACT

A pattern recognition security system ("PRSS") generates a packet signature from network traffic, including attack packets. The PRSS can utilize a statistical pattern recognition based approach to generate attack traffic signatures, such as for DDoS or DoS attacks. In some embodiments, the PRSS dynamically creates training sets from actual captured data, allowing the PRSS to adapt to changes in network attacks. For example, more sophisticated DDoS attacks commonly rotate through different attacking computers to vary the packet attributes of attack packets sent to a target system. However, as the PRSS can determine packet signatures based on the actual captured data packets, the PRSS can adapt to the changes in the attack. In some embodiments, the PRSS may determine packet signatures in real-time or near real time during an attack, allowing the PRSS to quickly react to changes in attack traffic.

28 Claims, 7 Drawing Sheets

| Attribute | Value | Count | Value | Count | Value | Count | Value | Count | Value | Count | Value | Count |
|---|---|---|---|---|---|---|---|---|---|---|---|---|
| Source IP | 103.83.220.123 | 3 (0.3) | 67.124.36.42 | 2 (0.2) | 125.37.42.67 | 2 (0.2) | 178.236.9.75 | 1 (0.1) | 72.21.36.128 | 1 (0.1) | 67.124.217.126 | 1 (0.1) |
| DestIP | 205.251.218.110 | 10 (1.0) | | | | | | | | | | |
| IPHeader Length | 20 | 10 (1.0) | | | | | | | | | | |
| Total Pkt Length | 74 | 3 (0.3) | 72 | 3 (0.3) | 69 | 2 (0.2) | 68 | 2 (0.2) | 66 | 1 (0.1) | 64 | 1 (0.1) |
| TTL | 56 | 5 (0.5) | 57 | 5 (0.5) | 48 | 3 (0.3) | | | | | | |
| IP Version | 4 | 10 (1.0) | | | | | | | | | | |
| IP Packet ID | 0 | 5 (0.5) | 16782 | 5 (0.5) | 342 | 1 (0.1) | 12723 | 1 (0.1) | 8686 | 1 (0.1) | 32322 | 1 (0.1) |
| Type of Service | 0 | 7 (0.7) | 8 | 2 (0.2) | 4 | 1 (0.1) | | | | | | |
| Fragment Flag | 0 | 9 (0.9) | 2 | 1 (0.1) | | | | | | | | |
| Fragment Offset | 0 | 10 (1.0) | | | | | | | | | | |
| Layer4 Protocol | 17 | 10 (1.0) | | | | | | | | | | |
| Source Port | 443 | 8 (0.8) | 46141 | 1 (0.1) | 5335 | 1 (0.1) | | | | | | |
| Dest Port | 53 | 10 (1.0) | | | | | | | | | | |
| UDP Header Length | 8 | 10 (1.0) | | | | | | | | | | |
| UDP Payload Length | 46 | 3 (0.3) | 44 | 3 (0.3) | 41 | 2 (0.2) | 40 | 2 (0.2) | 38 | 1 (0.1) | 36 | 1 (0.1) |
| UDP Total Length | 54 | 3 (0.3) | 52 | 3 (0.3) | 49 | 2 (0.2) | 48 | 2 (0.2) | 46 | 1 (0.1) | 44 | 1 (0.1) |

*Fig. 3*

|  | Packet1 | Prob | Packet2 | Prob | Packet3 | Prob | Packet4 | Prob | Packet5 | Prob |
|---|---|---|---|---|---|---|---|---|---|---|
| Source IP | 187.23.212.12 | 0.0909 | 187.23.212.13 | 0.0909 | 187.23.213.12 | 0.0909 | 187.23.213.13 | 0.0909 | 142.213.92.27 | 0.0909 |
| DestIP | 205.251.218.110 | 1.0 | 205.251.218.110 | 1.0 | 205.251.218.110 | 1.0 | 205.251.218.110 | 1.0 | 205.251.218.110 | 1.0 |
| IPHeader Length | 20 | 1.0 | 20 | 1.0 | 20 | 1.0 | 20 | 1.0 | 20 | 1.0 |
| Total Pkt Length | 74 | 0.3 | 72 | 0.2 | 68 | 0.2 | 74 | 0.3 | 66 | 0.1 |
| TTL | 241 | 0.909 | 240 | 0.909 | 241 | 0.909 | 240 | 0.909 | 243 | 0.909 |
| IP Version | 4 | 1.0 | 4 | 1.0 | 4 | 1.0 | 4 | 1.0 | 4 | 1.0 |
| IP Packet ID | 0 | 0.5 | 0 | 0.5 | 0 | 0.5 | 0 | 0.5 | 0 | 0.5 |
| Type of Service | 0 | 0.7 | 0 | 0.7 | 0 | 0.7 | 8 | 0.2 | 0 | 0.7 |
| Fragment Flag | 0 | 0.9 | 0 | 0.9 | 0 | 0.9 | 0 | 0.9 | 0 | 0.9 |
| Fragment Offset | 0 | 1.0 | 0 | 1.0 | 0 | 1.0 | 0 | 1.0 | 0 | 1.0 |
| Layer4 Protocol | 17 | 1.0 | 17 | 1.0 | 17 | 1.0 | 17 | 1.0 | 17 | 1.0 |
| Source Port | 23123 | 0.0909 | 23232 | 0.0909 | 46121 | 0.0909 | 53423 | 0.0909 | 24231 | 0.0909 |
| Dest Port | 53 | 1.0 | 53 | 1.0 | 53 | 1.0 | 53 | 1.0 | 53 | 1.0 |
| UDP Header Length | 8 | 1.0 | 8 | 1.0 | 8 | 1.0 | 8 | 1.0 | 8 | 1.0 |
| UDP Payload Length | 46 | 0.3 | 44 | 0.2 | 46 | 0.3 | 40 | 0.1 | 42 | 0.0909 |
| UDP Total Length | 54 | 0.3 | 52 | 0.2 | 54 | 0.3 | 48 | 0.1 | 50 | 0.0909 |
| Probability |  | 6.4091 x10-6 |  | 1.899x 10-6 |  | 2.1364x 10-6 |  | 2.0346x 10-7 |  | 1.9657x 10-6 |

*Fig. 4A*

|  | Packet6 | Prob | Packet7 | Prob | Packet8 | Prob | Packet9 | Prob | Packet10 | Prob |
|---|---|---|---|---|---|---|---|---|---|---|
| Source IP | 125.37.42.67 | 0.2 | 127.232.121.63 | 0.0909 | 69.232.32.23 | 0.0909 | 142.213.90.1 | 0.0909 | 142.213.92.27 | 0.0909 |
| DestIP | 205.251.218.110 | 1.0 | 205.251.218.110 | 1.0 | 205.251.218.110 | 1.0 | 205.251.218.110 | 1.0 | 205.251.218.110 | 1.0 |
| IPHeader Length | 20 | 1.0 | 20 | 1.0 | 20 | 1.0 | 20 | 1.0 | 20 | 1.0 |
| Total Pkt Length | 74 | 0.3 | 74 | 0.3 | 64 | 0.1 | 72 | 0.2 | 64 | 0.1 |
| TTL | 48 | 0.2 | 239 | 0.909 | 240 | 0.909 | 241 | 0.909 | 242 | 0.909 |
| IP Version | 4 | 1.0 | 4 | 1.0 | 4 | 1.0 | 4 | 1.0 | 4 | 1.0 |
| IP Packet ID | 0 | 0.5 | 31236 | 0.0909 | 40849 | 0.0909 | 0 | 0.5 | 0 | 0.5 |
| Type of Service | 0 | 0.7 | 8 | 0.2 | 8 | 0.2 | 0 | 0.7 | 0 | 0.7 |
| Fragment Flag | 0 | 0.9 | 0 | 0.9 | 0 | 0.9 | 0 | 0.9 | 0 | 0.9 |
| Fragment Offset | 0 | 1.0 | 0 | 1.0 | 0 | 1.0 | 0 | 1.0 | 0 | 1.0 |
| Layer4 Protocol | 17 | 1.0 | 17 | 1.0 | 17 | 1.0 | 17 | 1.0 | 17 | 1.0 |
| Source Port | 443 | 0.8 | 42342 | 0.0909 | 32432 | 0.0909 | 22423 | 0.0909 | 43523 | 0.0909 |
| Dest Port | 53 | 1.0 | 53 | 1.0 | 53 | 1.0 | 53 | 1.0 | 53 | 1.0 |
| UDP Header Length | 8 | 1.0 | 8 | 1.0 | 8 | 1.0 | 8 | 1.0 | 8 | 1.0 |
| UDP Payload Length | 46 | 0.3 | 46 | 0.3 | 44 | 0.2 | 42 | 0.0909 | 42 | 0.0909 |
| UDP Total Length | 54 | 0.3 | 54 | 0.3 | 52 | 0.2 | 50 | 0.0909 | 50 | 0.0909 |
| Probability |  | $2.7216 \times 10^{-4}$ |  | $3.3327 \times 10^{-7}$ |  | $4.9374 \times 10^{-8}$ |  | $1.9657 \times 10^{-7}$ |  | $1.9657 \times 10^{-7}$ |

Fig. 4B

ATTACK TRAFFIC SIGNATURE GENERATION USING STATISTICAL PATTERN RECOGNITION

BACKGROUND

A denial-of-service attack (DoS attack) or distributed denial-of-service attack (DDoS attack) is an attempt to make a computer or network resource unavailable to its intended users. Generally, DoS attacks consists of the concerted efforts of a person, or multiple people to prevent a network site or service from functioning efficiently or at all, temporarily or indefinitely. Targets of DoS attacks can include sites or services hosted on high-profile web servers such as cloud computing providers, e-commerce sites, banks, credit card payment gateways, and root name servers.

One common method of attack involves saturating the target machine with external communications requests, such that it cannot respond to legitimate traffic, or responds so slowly as to be rendered effectively unavailable. Such attacks usually lead to a server overload. In general terms, DoS attacks are implemented by either forcing the targeted computer(s) to reset, or consuming its resources so that it can no longer provide its intended service or obstructing the communication media between the intended users and the victim so that they can no longer communicate adequately.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

FIG. 3 illustrates an example histogram for data packets corresponding to an attack;

FIGS. 4A-B illustrate an example probability chart calculated using the baseline values in FIG. 3;

DETAILED DESCRIPTION OF SPECIFIC EMBODIMENTS

Overview

Figure 1:
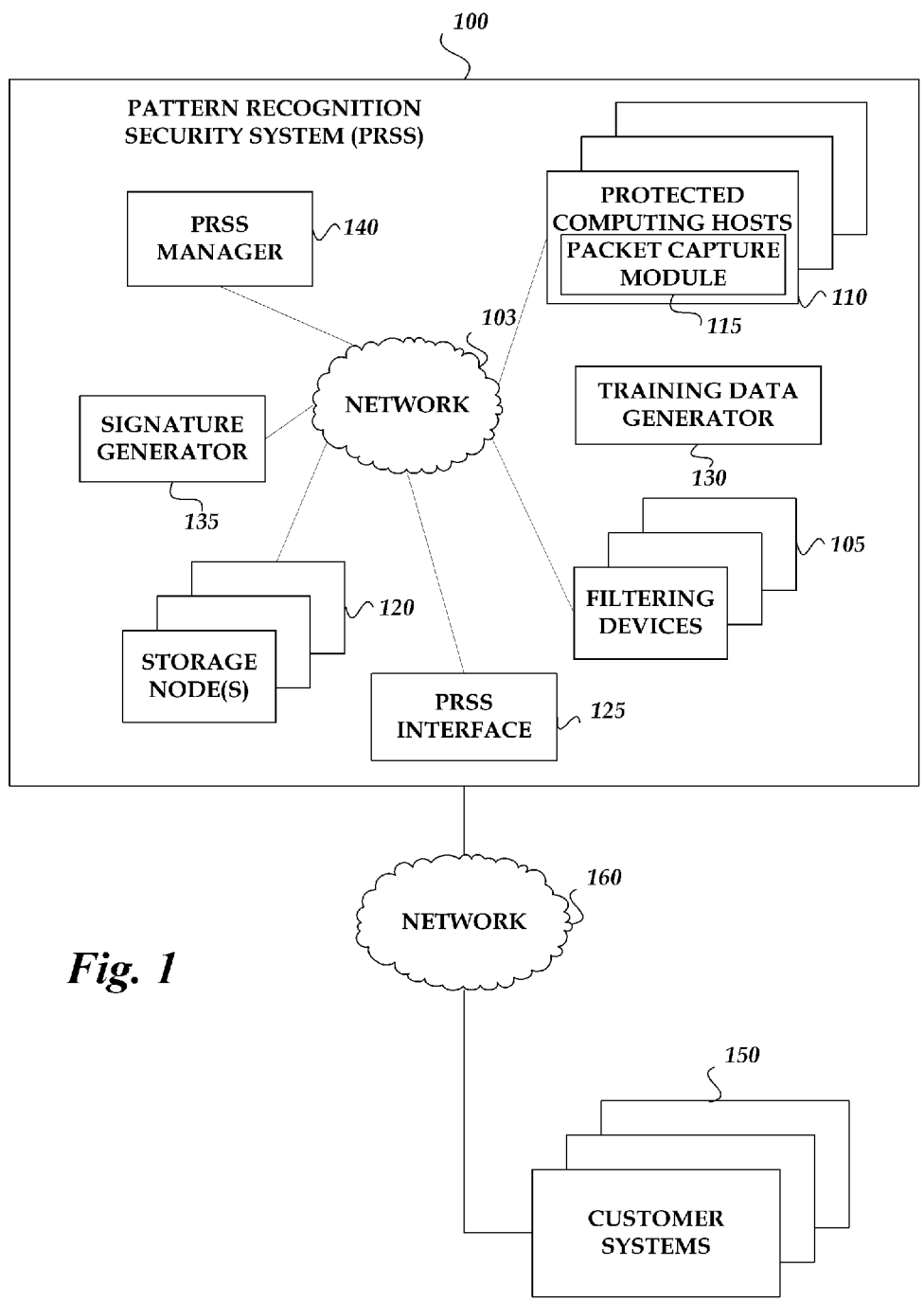
FIG. 1 is a network diagram schematically illustrating an example of a pattern recognition security system that generates attack signatures according to one embodiment.

Typically, a distributed denial-of-service (DDoS) attack is one in which a multitude of compromised systems attack a single target, thereby causing denial of service for users of the targeted system. The flood of incoming messages to the target system can essentially force it to shut down or can otherwise negatively impact the target system's performance, thereby denying or limiting service to legitimate users.

Often, detecting and responding to a DDoS attack is performed by a network administrator who analyzes the traffic and institutes counter-measures to the attack, such as blocking particular IP addresses. However, responding to an attack can be time-intensive, during which the performance of the target system remains negatively impacted. In addition, some attacks can be particularly complex and for which counter-measures are difficult to develop. Accordingly, automated methods and systems for handling DDoS attacks are needed that can allow users to more quickly analyze and respond to DDoS attacks or other types of attacks (e.g., DoS or degradation of service attacks).

Embodiments of a pattern recognition security system ("PRSS") are described below. In one embodiment, the pattern recognition security system 100 is a system that generates a packet signature from network traffic including attack packets. The pattern recognition security system 100 can utilize a statistical pattern recognition based approach to generate attack traffic signatures, such as for DoS or DDoS attacks. In some embodiments, the system 100 and techniques discussed below can be applied to other problems where training data is generated from two data sets. In one embodiment, the packet signature is generated based at least partly on the network traffic's layer-3 and/or layer-4 attributes. Other attributes can also be used, such as layer 7 or other attributes.

A signature can include a value (e.g. field/value pairs), algorithm, hash, and/or pattern that identifies an attack traffic flow (e.g., DDoS). Signatures generated by the pattern recognition security system 100 can be used to apply filtering rules on a router, firewall, or other network device that can help in mitigating DDoS attacks. In one embodiment the filtering rules may be applied automatically, without any manual intervention, while in another embodiment, the rules can be manually set up on the networking device.

In some embodiments, a decision tree algorithm, clustering algorithm, classifier algorithm or other traffic analysis algorithm can be used to generate signatures from captured data. Data packets are captured during an attack. The pattern recognition security system 100 can then analyze the attributes of each of the data packets to identify characteristics that are out of the ordinary. For example, the pattern recognition security system 100 may have previously established a baseline for each characteristic based on previously analyzed data packet captures. The pattern recognition security system 100 can then use those baselines to determine the probability that a particular data packet characteristic appears in normal traffic. In some embodiments, the pattern recognition security system 100 dynamically determines baseline values for the characteristics based on the set of captured data packets.

By analyzing these characteristics, the pattern recognition security system 100 can identify attack packets in the captured data. In one embodiment, the pattern recognition security system 100 designates as attack packets those data packets in the captured data with characteristics that have a low probability of appearing in normal traffic. In some embodiments, pattern recognition security system 100 may refer to a database of attack packets (or mine such a database) to determine characteristics that are associated with attack packets. For example, particular IP addresses may be associated with multiple instances of network attacks. Once the attack packets are identified, the pattern recognition security system 100 can generate a training set for a signature generating algorithm, such as a decision tree. The training set can include the attack packets and normal or non-attack packets. The training set is then provided to the signature generating algorithm, which sorts the packets and generates attack packet signatures. This process is described in further detail below in FIG. 2 and FIG. 5.

In some embodiments, the pattern recognition security system 100 dynamically creates training sets from actual captured data allowing the pattern recognition security system 100 to adapt to changes in network attacks. For example, more sophisticated DDoS attacks commonly rotate through different attacking computers to vary the packet attributes of attack packets sent to a target system. However, as the pattern recognition security system 100 can determine packet signatures based on the actual captured data packets, the pattern recognition security system 100 can adapt to the changes in the attack. In some embodiments, the pattern recognition security system 100 may determine packet signatures in realtime or near real time during an attack, allowing the pattern recognition security system 100 to quickly react to changes in attack traffic.

Various aspects of the disclosure will now be described with regard to certain examples and embodiments, which are intended to illustrate but not to limit the disclosure. Nothing in this disclosure is intended to imply that any particular feature or characteristic of the disclosed embodiments is essential. The scope of protection of certain inventions is defined by the claims.

Examples of Pattern Recognition Security System

FIG. 1 is a network diagram schematically illustrating an example of a pattern recognition security system 100 system ("PRSS") 100 that generates attack signatures. In some embodiments, the pattern recognition security system 100 includes various components that are connected via a network 103. For example, the pattern recognition security system 100 can include filtering devices 105, protected computing hosts 110, packet capture modules 115, storage nodes 120, a PRSS interface 125, a training data generator 130, a signature generator 135, and a PRSS manager 140. In some embodiments, two or more of the components may be operating on the same computing device or system.

Attack signatures generated by the pattern recognition security system 100 can be distributed to filtering devices 105, such as firewalls, routers, or other networking devices and/or protected computing hosts 110, such as hosts (virtual or physical), where the attack signatures can be used to filter out packets associated with DDoS attacks or other types of attacks. The filtering devices 105 and protected computing hosts 110 may be part of the pattern recognition security system 100 or may be in communication with the pattern recognition security system 100. In some embodiments, the pattern recognition security system 100 is part of a computing resources provider (e.g., a cloud computing provider) that can provide computing resources to multiple customers, such as individuals or business entities. For example, the system 100 may be operated by an operator of a cloud computing service, site hosting service, or other computing resource service provider for purposes of protecting its customers from attacks.

The signatures can be generated based on data packets collected from customers that may be hosted on the protected computing hosts 110. In one embodiment, packet capture modules 115 operate on the protected computing hosts 110 and capture the data packets. In some embodiments, the data packets are captured continuously, captured randomly, sampled or a combination of the above. For example, a packet capture module 115 can randomly capture data packets during a particular time period and keep capturing packets during subsequent time periods. In one embodiment, the packet capture module 115 uses different capturing method at different times. For example, the packet capture module may sample packets during normal operation but may then capture packets continuously during an attack. The data packets can be stored on storage nodes 120, along with other information, such as data packet metadata (e.g., source, capture time, etc.), baseline data (e.g., packet characteristic probabilities), signatures, user information or the like.

During or after an attack, a user can direct or request the pattern recognition security system 100 to generate an attack signature. In one embodiment, a user, who may be operating on a customer system 150 connected to the pattern recognition security system 100 via a network 160, accesses the PRSS interface 125 (e.g., a web service, program interface, message protocol or the like) and reports an attack on a target system. The user can specify a timeframe when an attack occurred or is occurring. The pattern recognition security system 100 can then obtain data packets captured during that time frame (e.g., from the storage nodes 120 or directly from the target system). In one embodiment, the user specifies a timeframe when no attack is occurring; captured packets from this timeframe can be used by the system to obtain "normal" or non-attack packets. Generally, a host system receives both legitimate and attacks packets, even during an attack. Thus, in some embodiments, the pattern recognition security system is configured to differentiate between legitimate packets and the attack packets received during an attack.

Using the captured data, which can include packets captured during an attack and/or during normal or non-attack situations, the training data generator 130 can identify likely attack packets in the captured data set and create a training set. The training set can be transmitted to the signature generator 135, which uses a signature generation algorithm, such as a decision tree algorithm, to generate an attack signature from the training set. The attack signature can then be provided to the filtering devices 105 and/or protected computing hosts 110 to alleviate or counter act an ongoing or a future attack.

Training Data Generation

Figure 2:
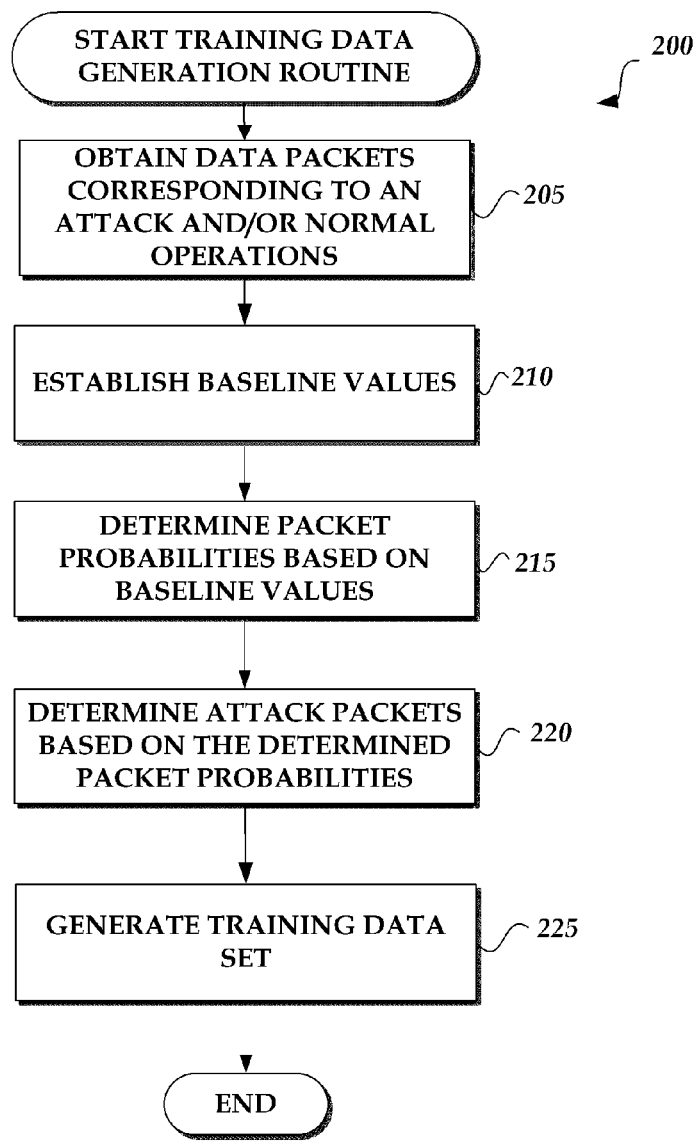
FIG. 2 schematically illustrates a logical flow diagram for an example training data generation process in the system of FIG. 1.

FIG. 2 schematically illustrates a logical flow diagram for an example training data generation process 200. In some implementations, the process is performed by embodiments of the pattern recognition security system 100 described with reference to FIG. 1 or by one of its components, such as the training data generator 130. For ease of explanation, the following describes the process as performed by the pattern recognition security system 100. The process is discussed in the context of an example scenario that is intended to illustrate, but not to limit, various aspects of the pattern recognition security system 100.

Beginning at block 205, the pattern recognition security system 100 obtains data packets corresponding to an attack and/or normal operations (e.g., non-attack situations). For example, the pattern recognition security system 100 can receive a report from a user that a hosted server is under attack. The report can include a specified time-window for the attack and can include a second time window for normal operations. In one embodiment, the pattern recognition security system 100 stores data packets captured from associated protected computing hosts 110. In response to the reported attack, the pattern recognition security system 100 can retrieve stored data packet captures (which can be stored on a storage node 120) that correspond to the specified time-window or time-windows and the particular protected computing host under attack. For this example scenario, the pattern recognition security system 100 retrieves 10 packets corresponding to an attack and 10 packets corresponding to normal operations. In other situations, the pattern recognition security system 100 can obtain different numbers of packets.

At block 210, the pattern recognition security system 100 establishes a baseline for the data packets. The baseline values identify probabilities of certain packet characteristics and can be used to identify uncommon or abnormal packets, such as attack packets. In the discussed scenario, the baseline values are calculated using data packets captured during normal operations (e.g., during times where no attacks were occurring). FIG. 3 illustrates an example histogram for the data packets corresponding to normal operations, discussed in further detail below. In one embodiment, the data packets corresponding to an attack are used to calculate the baseline.

The pattern recognition security system 100 can estimate baseline values for selected attributes encountered during evaluation of the packets captured during the attack. For example, the pattern recognition security system 100 can estimate various probabilities, such as P(Packet with TotalLength=x), P(Packet with TCPWindowSize=y), etc., where x and y are values that have been observed for those attributes in the sample-set of normal traffic.

The pattern recognition security system 100 may also use a Laplacian smoothing algorithm (or other algorithm) to smooth the estimated probabilities. In one embodiment, the pattern recognition security system 100 can add a +1 (or other offset such as +2, +3, +4, etc.) in the numerator and denominator to accommodate values not seen before. For example, if there are N packets with totalLength=44, from a set of M normal packets, the baseline for totalLength=44 is (N+1)/(M+1). During an evaluation phase, if the pattern recognition security system 100 sees a packet with totalLength=46 (not seen before), instead of assigning it a value of 0, the pattern recognition security system 100 can assign it a smaller probability of 1/(M+1).

Returning to block 215 in FIG. 2, the pattern recognition security system 100 determines packet probabilities for the packets captured during the attack based on the baseline values. In one embodiment, the pattern recognition security system 100 iterates through each attribute and computes the probability of the attribute's value occurring based on the established baseline values.

In one embodiment the pattern recognition security system 100 assumes that packet characteristics are independent (e.g., Naive Bayes) when calculating the values. For example, the pattern recognition security system 100 can multiply the probabilities of each of the attributes of a given packet, to obtain an overall probability of the packet being part of the attack traffic. In one embodiment, the pattern recognition security system 100 can use a smoothing algorithm, such as described above, to assign non-zero probabilities to values not previously encountered. An example probability table for the data packets is shown in FIGS. 4A-B, described in further detail below.

Returning to block 220 in FIG. 2, the pattern recognition security system 100 determines likely attack packets based on the determined packet probabilities for the packets captured during the attack. In one embodiment, the pattern recognition security system 100 uses the determined probabilities to classify the data packets captured during an attack into "good" (e.g., normal or non-attack packets) or "bad" (e.g., attack packets) packets.

In one embodiment, the pattern recognition security system 100 groups the data packets into two clusters. In the ideal case, all normal packets are clustered with higher values of probabilities while attack packets are clustered with lower values of probabilities. In some cases (such as non-ideal cases), there can be some overlap between the two clusters. In some situations, it may make sense to use more than two clusters. For example, in some data sets, the data points may cluster into three, four or more than four different clusters.

The pattern recognition security system 100 can use a clustering algorithm (e.g., a K-Means clustering algorithm with K=2 and with random starting points) to cluster the data packets. The clustering algorithm can be iterated until there are no more changes to the assignment of each packet to the clusters between consecutive iterations.

In some situations, the probability values may be very small, which can detrimentally affect the clustering algorithm. Accordingly, in one embodiment, the pattern recognition security system 100 modifies the dataset before running the clustering algorithm. For example, the pattern recognition security system 100 can calculate clustering values based on the packet probabilities and use those calculated values rather than the probabilities. In one embodiment, the pattern recognition security system 100 uses the following example formula to calculate the clustering values: log (1/P,10) where:

P=probability of this packet being part of the baseline traffic;

1/P—gets the range of values to be >0 (however this causes the values to be very high, but a non-linear function can be used to reduce the values); and log(1/P,10)—using the non-linear function (logarithm to the base10) of the above value allows the values to be collapsed to a smaller range and at the same time maintain separation between distinct values.

While the above formula uses a logarithmic function, other functions (e.g., linear/non-linear) that collapse the range of values to a smaller range can also be used.

Once the pattern recognition security system 100 determines the 2 clusters, the pattern recognition security system 100 determines the average probability of each cluster and designates the packets in the cluster with lower average probability as the attack packets. As the clustering is based on probabilities, in some situations, actual attack packets may end up in the determined "normal" cluster while actual normal packets may end up in the determined "attack" cluster.

Continuing to block 225, the pattern recognition security system 100 generates a training data set. In one embodiment, the pattern recognition security system 100 discards the "normal" cluster. The pattern recognition security system 100 may then label or otherwise designate the N packets in the "attack" cluster as "attack" packets. In one embodiment, the pattern recognition security system 100 then adds additional N packets captured during normal traffic to the set of "attack" packets, while designating these packets as "normal" packets. By mixing an equal number or about equal number of "normal" and "attack" packets, the pattern recognition security system 100 generates a training data set with an equal representation from both classes to provide to the signature generation algorithm. However, in some embodiments, the pattern recognition security system 100 may use unequal proportions of "attack" and "normal" packets. After generating the training data set, the training data routine 200 can end.

FIG. 3 illustrates an example histogram for the data packets corresponding to normal operations in the scenario of FIG. 2, where 10 data packets are obtained. The pattern recognition security system 100 determines values 310 and counts 315 for selected attributes 305. In some embodiments, the attributes are level 3 or level 4 characteristics of the data packets. Attributes can include the source Internet Protocol ("IP"), destination IP address, IP header length, total packet length, time to live ("TTL"), IP version, IP packet ID, type of service, fragment flag, fragment offset, protocol type (e.g., Layer4 protocol), source port, destination port, Universal Data Protocol ("UDP") header length, UDP payload length, and UDP total length. Other attributes can also be used. In FIG. 3, the determined probabilities of each attribute value are shown next to the respective counts. For example, packets having a value of 103.83.220.123 have a count of 3 and a probability of 0.3 (i.e. value count/total packets=3/10=0.03 or 30%).

FIGS. 4A-B illustrate an example probability chart 400 calculated using the baseline values in FIG. 3. The chart displays the attributes 405 of each of the 10 particular packets captured during an attack and shows the calculated probability for each packet having those particular attributes. The particular probability of each attribute used in the probability calculation in the probability chart 400 comes from the determined baseline values shown in FIG. 3. As discussed above, for values that haven't been seen before, the pattern recognition security system 100 can use a default value of 1/(NumberOfTrainingSamples+1)=1/(10+1)=1/11.

In the example chart, the probability calculation assumes the attributes are independent of each other. However, other formulas can be used to calculate the probability that account for joint dependencies between variables.

Figure 5:
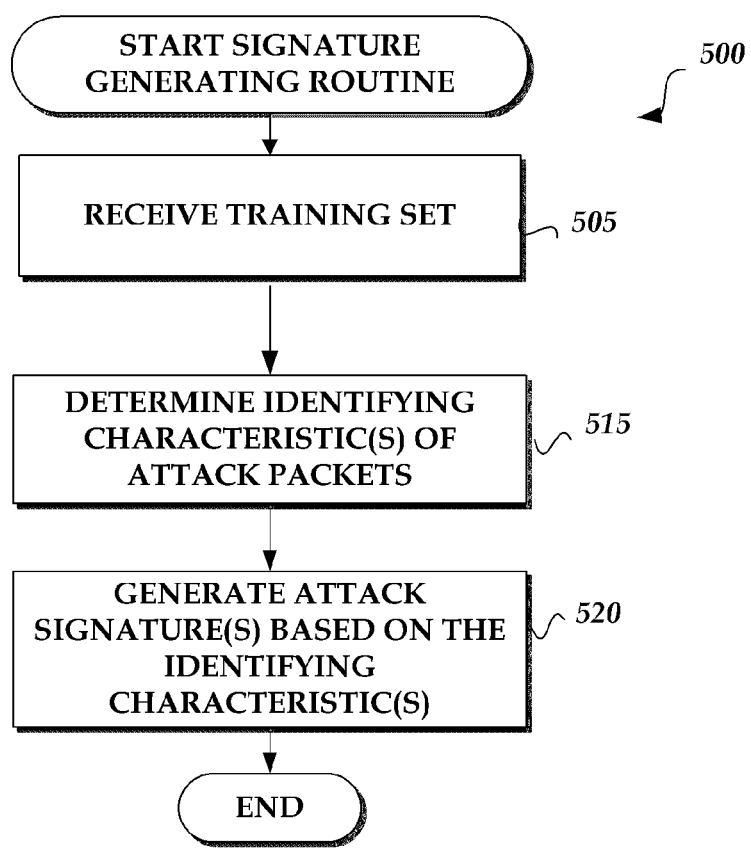
FIG. 5 schematically illustrates a logical flow diagram for an example signature generation process.

FIG. 5 schematically illustrates a logical flow diagram for an example signature generation process 500. In some implementations, the process is performed by embodiments of the pattern recognition security system 100 described with reference to FIG. 1 or by one of its components, such as the signature generator 135. For ease of explanation, the following describes the process as performed by the pattern recognition security system 100. The process is discussed in the context of the example scenario of FIG. 2 that is intended to illustrate, but not to limit, various aspects of the pattern recognition security system 100.

At block 505, the pattern recognition security system 100 receives the training set. The training set may have been generated by a component of the pattern recognition security system 100 or may be received from an external source.

Example Classifier Algorithms

At block 515, the pattern recognition security system 100 determines identifying characteristics of the attack packets. In one embodiment, a decision tree algorithm is used to process the training set. Various decision tree algorithms can be used, such as Iterative Dichotomiser 3 (ID3), C4.5 algorithm, CHi-squared Automatic Interaction Detector (CHAID), or Multivariate adaptive regression splines (MARS). Other algorithms may also be used.

In some preferred embodiments, the pattern recognition security system 100 uses ID3, C4.5, or variations as a signature generating algorithm. An embodiment of the ID3 algorithm can be summarized as follows:

Take all unused attributes and count their entropy concerning test samples;
Choose attribute for which entropy is minimum (or, equivalently, information gain is maximum); and
Make a node containing that attribute.

---

A more detailed example of the ID3 algorithm in pseudo code follows:

ID3 (Examples, Target_Attribute, Attributes)
  Create a root node for the tree
  If all examples are positive, Return the single-node tree Root, with label = +.
  If all examples are negative, Return the single-node tree Root, with label = −.
  If number of predicting attributes is empty, then Return the single node tree Root, with label = most common value of the target attribute in the examples.
  Otherwise Begin
    A = The Attribute that best classifies examples.
    Decision Tree attribute for Root = A.
    For each possible value, $v_i$, of A,
      Add a new tree branch below Root, corresponding to the test A = $v_i$.
      Let Examples($v_i$) be the subset of examples that have the value $v_i$ for A
      If Examples($v_i$) is empty
      Then below this new branch add a leaf node with label = most common target value in the examples
      Else below this new branch add the subtree ID3 (Examples($v_i$), Target_Attribute, Attributes − {A})
    End
  Return Root

---

A more detailed example of the C4.5 algorithm in pseudo code follows:
  Check for base cases
  For each attribute "A"
    Find the normalized information gain from splitting on "A"
  Let A_Best be the attribute with the highest normalized information gain
  Create a decision node that splits on A_Best
  Recurse on the sub-lists obtained by splitting on A_Best and add those nodes as children of the decision node In one embodiment, the base cases for C4.5 include:
  All the samples in the list belong to the same class. When this happens, the C4.5 algorithm creates a leaf node for the decision tree saying to choose that class.
  None of the features provide any information gain. In this case, the C4.5 algorithm creates a decision node higher up the tree using the expected value of the class.
  Instance of previously-unseen class encountered. Again, the C4.5 algorithm creates a decision node higher up the tree using the expected value.

In one embodiment, the pattern recognition security system 100 uses an implementation of the ID3 algorithm which can be summarized in the following steps:
  Determine the overall Entropy of the dataset, where:
    Entropy (H)=−P(packet=>Attack)*log(1/P(packet=>Attack))−P(packet=>Normal)*log(1/P(packet=>Normal)), where P(packet=>Attack) is computed as (#Packets labeled as Attack)/(Total #Packets)
  Determine the Entropy of the dataset ("attack" versus "normal") using only values for attribute A
  Compute the above Entropy of the dataset for each attribute and choose the attribute that has the highest InformationGain, which is defined as:
    (OverallEntropy)—(Entropy of dataset using only values for attribute A)

In one embodiment, the decision tree algorithm continues growing the tree and at each steps tries to determine which attribute might be the best attribute to use to split the dataset. The algorithm can halt when each of the leaves has only 1 class (e.g. "attack" or "normal"). Various other stopping parameters can be used. For example, the algorithm can stop when the following conditions are met:
  if OverallEntropy at each level<x; or
  if InformationGain for any attribute<y or if total number of instances for a certain class is less than n %).

For example, applying the above algorithm in an example scenario, such as the scenario discussed for FIG. 2, results in the following computed entropy for each attribute-value:
  DestinationIP: 0.998
  Layer4Protocol: 0.998
  FragmentOffset: 0.998
  IPPacketVersion: 0.998
  DestinationPort: 0.998
  IPHeaderLength: 0.998
  UDPHeaderLength: 0.998
  FragmentFlag: 0.9474
  TypeOfService: 0.9971
  TotalPacketLength: 0.9776
  UDPPayloadLength: 0.8630
  UDPTotalLength: 0.8630
  IPPacketID: 0.9368
  TimeToLive: 0.0

Based on the above scenario, the pattern recognition security system 100 determines that the TTL attribute splits the data set cleanly into attack and normal packets when the TTL value is 57 (where the calculated entropy is 0.0). The pattern recognition security system 100 then splits the set of data packets using the best attribute found (e.g., if the TTL>57 then the packet is an "attack" packet, else the packet is a "normal" packet).

However, if there was no clean split, then the pattern recognition security system 100 can continue iterating through the algorithm. In one embodiment, the pattern recognition security system 100 excludes portions of the training data set that don't agree with the constraint for the selected node (e.g., TTL). For example, if the rule: TTL>57 resulted in 5 attack packets and 1 normal packet, then on the next iteration for this branch, the dataset considered would include only the 6 packets. This way the algorithm keeps filtering out packets until it achieves a clean split.

As discussed above, the system 100 determines that the TTL value of 57 is the value to split the data set. The following example below describes one embodiment of a process for how that value is calculated.

The distinct TTL values for baseline packets are: 56, 57 and 48, with 5, 3 and 2 of such baseline packets respectively. Based on the example probability chart 400, the distinct TTL values for packets found during the attack-window are: 48, 239, 240, 241, 242 and 243, with 1, 1, 3, 3, 1 and 1 of such packets respectively. After determining the packet probabilities and performing the clustering, the packet in the attack window that has TTL=48 is marked as normal, resulting in only 9 remaining attack packets in the training set, which have distinct TTL values of: 239, 240, 241, 242 and 243, with 1, 3, 3, 1 and 1 of such packets respectively.

Next the pattern recognition security system 100 determines the entropy for each attribute-value after sorting the numeric values. For TTL, the attribute values in order are: 48, 56, 57, 239, 240, 241, 242, and 243. The system computes the entropy for each of such values using the following calculations:

(1) Entropy(X)=Sum across all possible classes of X $(-1*p(X_i)*\log(p(X_i)))$, where $p(X_i)$=>probability of the class $X_i$. The system 100 then calculates the entropy for the TTL values.

(2) Entropy(TTL<=x)=$-1*p(A)*\log(p(A))+(-1*p(B)*\log(p(B)))$, where A=>attack class, p(A)=>probability of TTL<=x within the attack class. Similarly, B=>baseline class, p(B)=>probability of TTL<=x within the baseline class.

(3) Entropy(TTL<=48)=$-1*0/9*\log(0/9)-(1/10)*\log(1/10)$ since there are 0 attack packets with TTL<=48 from 9 attack packets and there is 1 baseline packet with TTL<=48 among 10 baseline packets. So Entropy (TTL<=48)=0.1 (For these computations, if p(A)=0 then the system 100 does not compute log(p(A))—since log(0) is undefined, but assumes that portion of the equation to be 0).

(4) Similarly, Entropy (TTL<=56)=$-1*0/9*\log(0/9)+-1*(7/10)*\log(7/10)=0+-1*(-0.108)=0.108$ (5) Similarly, Entropy (TTL<=57)=$-1*0/9*\log(0/9)+-1*(10/10)*\log(10/10)=0+-1*-1*(0)=0$ (6) Entropy(TTL<=239)=$/9*\log(1/9)+-1*(10/10)*\log(10/10)=0.106-0=0.106$. Similar calculations are made for the other values of the TTL.

From the above, the system 100 determines that when using TTL as the attribute to split the data set, then TTL<=57 is the value that results in the lowest entropy and thus the system 100 uses that value to split the data set.

At block 520, the pattern recognition security system 100 generates an attack signature(s) based on the determined identifying characteristic(s) of the "attack" packets. In the above example where the identifying characteristic was "TTL," this results in a signature of TTL>57.0. The pattern recognition security system 100 can then distribute that signature to filtering devices or protected computing hosts. For example, the signature can be applied to the protected computing host associated with the user reporting the attack. Ideally, the signature can be used by the protected computing host to ameliorate the effect of the attack by allowing it to filter out attack packets. In some embodiments, the signature may also be distributed to other protected computing hosts or filtering devices in order to "immunize" those protected computing hosts from a particular attacker.

As will be apparent, different training set packets can result in different signatures. For example, attackers could use different sets of computers to perform an attack, resulting in different attack packets being captured. Thus, signatures could vary widely depending on the observer data packets.

Below are examples of some signatures based on some example data sets:

If: TCP Header Length<30 Then: label packet as Attack (8011 instances ~98.08%)

If: TCP Header Length>=30 AND PacketTotalLength<99 Then: label packet as Attack (55 instances ~0.67%)

If: TCP Header Length<30 AND PacketTotalLength between (300,447) Then: label packet as Attack (32 instances ~0.39%)

If: TCP Header Length<30 AND PacketTotalLength between (108,126) Then: label packet as Attack (25 instances ~0.30%)

If: TCP Header Length<30 AND PacketTotalLength between (99,126) AND TCPWindowSize<374 Then: label packet as Attack (3 instances ~0.03%)

If: TCP Header Length<30 AND PacketTotalLength between (99,126) AND TCPWindowSize>=3277 AND TTL<60 Then: label packet as Attack (3 instances ~0.03%)

If: TCP Header Length<30 AND PacketTotalLength between (447,486) AND TCPWindowSize<5872 Then: label packet as Attack (2 instances ~0.02%)

If: TCP Header Length<30 AND PacketTotalLength>=800 AND TCPWindowSize<5872 Then: label packet as Attack (14 instances ~0.17%)

Signatures can include one or more identifying attributes. For example, several of the above signatures include 2 or 3 attributes. These signatures can be converted into filtering rules for filtering out packets received at protected computing hosts or network devices. In some embodiments, the filtering rules are permissive (e.g., allow all packets with corresponding to a "normal" signature), while in some embodiments, filtering rules are restrictive (e.g., block all packets corresponding to an "attack" signature).

While the above disclosure describes the pattern recognition security system 100 as using the C4.5 or the ID3 algorithms, the pattern recognition security system 100 can also use other algorithms for signature generation. In some embodiments, the pattern recognition security system 100 can use variations on the C4.5 or the ID3 algorithms. For example, costs may be associated with different attributes or nodes of the tree may be pruned. In one example, forward-pruning is used on the decision tree, where the tree stops growing beyond a certain threshold, such as when 95% of samples belong to one class. In another example, the tree may continue growing until each leaf node has just one class of samples. In one example, attributes may be grouped together (e.g., if SourceIP in [IP1, IP2, IP3] then . . . ) while in other examples, each attribute can have a separate branch (e.g., rule1: if SourceIP=IP1 then . . . ; rule2: if SourceIP=IP2 then . . . ; rule3: if SourceIP=IP3 then . . . ).

Attack Packet Signature Generation

Figure 6:
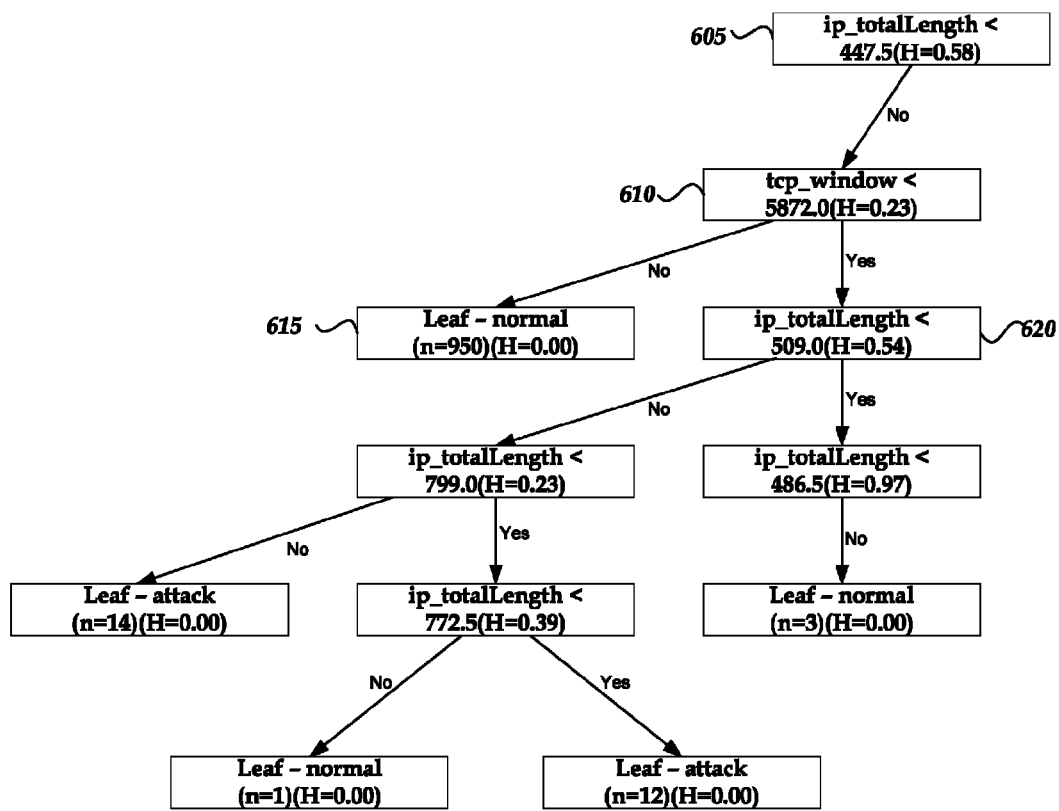
FIG. 6 schematically illustrates a portion of a sample decision tree created using a decision tree algorithm.

FIG. 6 schematically illustrates a portion of a sample decision tree created using a decision tree algorithm. Some of the branches in the decision tree are not shown. In the sample decision tree, a given node depicts a condition (e.g., attribute and associated value), number of instances and/or entropy. In the FIG. 6, N=number of instances and H=entropy at the given node for the traffic type (e.g., attack or normal). Generally, entropy is a measure of the uncertainty associated with a random variable. Thus, a value of 0.00 represents certainty that a particular packet is an "attack" or a "normal" packet.

For example, branch node 605 shows that for a particular data set, the condition of "ip_totalLength<447.5" has a calculated entropy value of H=0.58. Branch node 610 (where the parent node condition is not true) represents packets where ip_totalLength>=447.5 and includes the condition "tcp_window<5872.0." Leaf node 615 represents 950 packets deemed (H=0.00) to be "normal" packets that correspond to packets where ip_totalLength>=447.5 and tcp_window>=5872.0. Branch node 620 represents packets where ip_totalLength>=447.5 and ip_totalLength>=447.5.

Alternative Implementations

In some embodiments, the pattern recognition security system 100 generates training sets by identifying possible attack sources and designating packets from those sources as attack packets. For example, in one implementation, the system 100 detects possible attack source based on certain metrics, such as, for example, by selecting the top N sources based on the number of packets received from the sources. Other metrics can include the frequency of the packets sent by a source, time clustering of the packets sent, type of packets sent, and/or other metrics.

In one embodiment, the pattern recognition security system 100 identifies the top packet senders for the duration of the attack. For example, the system 100 identifies the top 10 senders, with the senders having the following IP addresses: sourceIP=IP1, IP2, IP10. The pattern recognition security system 100 can then filter the packets during the attack window based on the above IP address. For example, packets whose source IP address is one of IP1, IP2 . . . IP10 can be flagged as attack packets. The pattern recognition security system 100 can then generate a data set from these packets, as described above.

In some embodiments, the pattern recognition security system 100 generates training sets by identifying attack and baseline packets based on clustering. The pattern recognition security system 100 can cluster together the packets based on their similarity to each other using similarity metric(s). For example, the pattern recognition security system 100 can convert the packet attribute values to numbers in order to represent each packet as a vector of numbers. The system 100 can then use one or more of the existing distance metrics (e.g., Euclidean, Manhattan, etc.) to group packets that are close to each other based on this distance measure into a single cluster. The system 100 can use this distance measure to split the packets into two clusters that represent the baseline and attack packets. In some embodiments, the system 100 can split the data set into multiple clusters, with a metric defining which cluster(s) to designate as attack packets. The pattern recognition security system 100 can then generate a data set from these packets, as described above.

Many variations of the pattern recognition security system 100 are possible. For example, while the above disclosure generally describes directly identifying attack packets, in some embodiments, the system can identify attack packets indirectly by identifying normal packets and designating non-normal packets as attack packets. In another example, in one embodiment, the protected computing hosts 110 of FIG. 1 comprise one or more physical computing systems and/or one or more virtual machines instances that are hosted on one or more physical computing systems. For example, a host computing system may provide multiple virtual machines instances and include a virtual machine ("VM") manager to manage those virtual machines (e.g., a hypervisor or other virtual machine monitor). Customers may operate hosted applications, such as web servers or services, on the protected computing hosts 110.

In one embodiment, the pattern recognition security system 100 includes a network attack detector (e.g., hardware and/or software) for automatically detecting network attacks. In response to detecting an attack, the pattern recognition security system 100 (e.g., the signature generator 135) can generate packet signatures and/or filtering rules that can be distributed to the target computing host (or to other computing hosts 110 or filtering devices). By detecting and responding to attacks, the pattern recognition security system 100 can automatically protect computing hosts 110 from attacks.

In some embodiments, the storage nodes 120 of FIG. 1 include hard drives, solid state memory, optical disc, and/or the like. The storage nodes 120 can store data on electronic files, databases, or other data structure.

In one embodiment, the PRSS manager 140 of FIG. 1 may monitor, track and/or manage the processes of the pattern recognition security system 100. The PRSS manager 140 can be in communication with other components of the pattern recognition security system 100 via the network 103. The network 103 may include multiple networking devices (not shown) such as, e.g., switches, edge routers, core routers, etc. The network 103 may, but need not be, a different network than the network 160 shown in FIG. 1.

In one embodiment, the pattern recognition security system 100 allows users to review security data, report attacks, and/or apply attack signatures. In one embodiment, the pattern recognition security system 100 includes a web service that receives attack reports, instructions, or other communications from users. For example, the system 100 may host a web-based or other interface that provides functionality for web site operators, cloud computing service customers, and/or other users to report attacks, including the targets of such attacks and the associated time periods, and to also specify when the no attacks were occurring.

As described above, the pattern recognition security system 100 can be implemented with one or more physical servers or other computing machines, such as several computing machines interconnected via a network. Thus, each of the components depicted in the pattern recognition security system 100 can include hardware and/or software for performing various features. In one embodiment, the pattern recognition security system 100 is implemented on a computing system that hosts a web site or collection of web sites that the system 100 protects.

The pattern recognition security system 100 can include one or more servers for receiving and responding to network requests from the customer systems 150. The one or more servers can include web servers, application servers, database servers, combinations of the same, or the like. In some embodiments, the network 103 is a publicly accessible network of linked networks, possibly operated by various distinct parties, such as the Internet. In other embodiments, the network 103 may be a private network, such as, for example, a corporate or university network that is wholly or partially inaccessible to non-privileged users. In still other embodiments, the network 103 may include one or more private networks with access to and/or from the Internet.

The processing of the various components of the pattern recognition security system 100 can be distributed across multiple machines, networks, and other computing resources. The various components of the pattern recognition security system 100 can also be implemented in one or more virtual machines, rather than in dedicated servers. Likewise, the data repositories shown can represent physical and/or logical data storage, including, for example, storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

In some embodiments, the pattern recognition security system 100 may be configured differently than illustrated in the figures above. For example, various functionalities provided by the illustrated modules can be combined, rearranged, added, or deleted. In some embodiments, additional or different processors or modules may perform some or all of the functionalities described with reference to the example embodiment illustrated in the figures above. Many implementation variations are possible.

Other types of interactions (additionally or alternatively) between the pattern recognition security system 100 and the customer systems are possible in addition to those described above. For example, a pattern recognition security system 100 submission or command can be received directly from a user (e.g., via an interactive console or other GUI provided by the pattern recognition security system 100) or from an executing program on a customer computing system. In some embodiments, users may interact with the pattern recognition security system 100 using other types of interfaces and in other ways. For example, the pattern recognition security system 100 may provide a web services interface (e.g., a web page or set of web pages) that allows a user to submit a request using a web browser. Other types of interfaces may also be used.

In some embodiments, the pattern recognition security system 100 and its components are executed or embodied by one or more physical or virtual computing systems. For example, in some embodiments, a server computing system that has components including a central processing unit (CPU), input/output (I/O) components, storage, and memory may be used to execute some or all of the components of the pattern recognition security system 100 such as, e.g., the PRSS manager 140. In some embodiments, the pattern recognition security system 100 may be configured differently than described above. The I/O components can include a display, a network connection to the network 103, a computer-readable media drive, and other I/O devices (e.g., a keyboard, a mouse, speakers, etc.).

An embodiment of the pattern recognition security system 100 can be stored as one or more executable program modules in the memory of the server and/or on other types of non-transitory computer-readable storage media, and the pattern recognition security system 100 can interact with protected computing hosts (e.g., physical computing systems and/or virtual machine instances) over the network. In one embodiment, the pattern recognition security system 100 may have additional components or fewer components than described above. For example, the pattern recognition security system 100 may be built on top of existing software development or testing systems and designed to coordinate the actions of the existing systems.

Each of the processes, methods, and algorithms described in the preceding sections may be embodied in, and fully or partially automated by, code modules executed by one or more computers, computer processors, or machines configured to execute computer instructions. The code modules may be stored on any type of non-transitory computer-readable medium or tangible computer storage device, such as hard drives, solid state memory, optical disc, and/or the like. The systems and modules may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, act, operations, and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein.

What is claimed is:

1. A method for generating attack packet signatures, the method comprising:
   by a signature generating system comprising computing hardware:
   determining baseline values for attributes of a second set of data packets captured during normal operations;
   obtaining data packets corresponding to a network attack on a target system;
   determining packet probabilities for the obtained data packets, wherein each packet probability indicates a probability that an individual data packet of the obtained data packets corresponds to a network attack, and wherein each packet probability is based at least partly on the determined baseline values for the attributes of the second set of data packets;
   designating at least a portion of the data packets as attack packets based at least partly on the determined packet probabilities that individual data packets of the obtained data packets correspond to a network attack;
   generating a training data set including the attack packets designated based at least partly on the determined probabilities; and
   generating a packet signature for attack packets based at least partly on the training data set including the attack packets designated based at least partly on the determined packet probabilities.

2. The method of claim 1, wherein the signature generating system uses a decision tree algorithm to generate the packet signature.

3. The method of claim 1, further comprising providing the packet signature to the target system.

4. The method of claim 1, further comprising filtering out likely attack packets based on the packet signature.

5. The method of claim 1, further comprising generating a packet filter rule based at least partly on the packet signature.

6. The method of claim 1, wherein the training data set includes non-attack packets.

7. The method of claim 1, wherein designating at least a portion of the data packets as attack packets comprises:
   clustering the data packets into normal and attack clusters based at least partly on the determined packet probabilities; and
   designating packets of the attack cluster as attack packets.

8. The method of claim 7, wherein low probability packets are designated as attack packets.

9. The method of claim 1, wherein the network attack comprises a denial of service (DoS) attack.

10. The method of claim 1, wherein designating at least a portion of the data packets as attack packets comprises determining that the data packets of the designated portion have an above average probability to correspond to a network attack, wherein the average probability is determined by averaging packet probabilities of a majority of the data packets.

11. The method of claim 10 further comprising designating a second portion of the data packets as non-attack packets based at least partly on determining that the data packets of the designated second portion have below the average probability to correspond to a network attack.

12. A system for generating packet signatures, the system comprising:
   a packet capture module configured to capture data packets during a network attack on a target computing system;
   a training data generator configured to generate a training data set from the captured data packets, wherein the training data set includes attack packets selected from the captured data packets based at least in part on a set of determined packet probabilities, each packet probability indicating a probability that an individual data packet of the captured data packets corresponds to a network attack; and
   a signature generator configured to generate a packet signature for attack packets based at least partly on the training data including the attack packets selected based at least partly on the determined packet probabilities that individual packets correspond to a network attack.

13. The system of claim 12, wherein the attack packets are identified based at least partly on calculated probabilities of individual data packets having particular packet attributes.

14. The system of claim 12, wherein the attack packets are identified based at least partly on number of packets transmitted by a packet source.

15. The system of claim 12, wherein the attack packets are identified based at least partly on clustering algorithms for grouping the captured data packets.

16. The system of claim 12, wherein the signature generator uses a decision tree algorithm to generate the packet signature.

17. The system of claim 12, further comprising the target computing system, wherein the target computing system receives the packet signature and subsequently filters packets based on the packet signature.

18. The system of claim 17, wherein the target computing system includes a protected computing host for hosting customer applications.

19. The system of claim 17, wherein a packet filter rule is generated from the packet signature and packets received on the target computing system are filtered using the packet filter rule.

20. The system of claim 12, further comprising a network device, the network device configured to filter packets directed to the target computing system based at least partly on the packet signature.

21. The system of claim 12, wherein the signature generator is configured to generate the packet signature substantially in real-time in the course of the network attack.

22. The system of claim 12, further comprising a network attack detector in communication with the signature generator, wherein the signature generator is further configured to generate a packet signature in response to the network attack detector detecting a network attack.

23. Non-transitory computer storage having stored thereon instructions that, when executed by a computer system, cause the computer system to:
   compare a first set of data packets captured during a network attack on a target system with a second set of data packets captured during a different time period than the network attack to determine a set of packet probabilities, each packet probability indicating a probability that an individual data packet of the first set of data packets corresponds to a network attack;
   designate at least a portion of the data packets as attack packets based at least partly on the determined packet probabilities that individual packets of the first set of data packets correspond to a network attack; and generate a packet signature for attack packets based at least partly on the identified attack packets designated based at least partly on the determined packet probabilities.

24. The non-transitory computer storage of claim 23, wherein the packet signature is generated using a decision tree algorithm.

25. The non-transitory computer storage of claim 23, further having instructions that cause the computer system to determine packet attributes that indicate an attack packet based at least partly on the packet attributes of the identified attack packets.

26. The non-transitory computer storage of claim 25, wherein the packet signature is generated based at least partly on the determined packet attributes that indicate an attack packet.

27. The non-transitory computer storage of claim 25, wherein particular values of the packet attributes are determined to indicate an attack packet.

28. The non-transitory computer storage of claim 23, wherein the packet signature specifies characterizing attributes of attack packets.

\* \* \* \* \*